April 27, 1965     C. T. CASALE II     3,180,975
BINARY COUNTER Filed Jan. 24, 1961     7 Sheets-Sheet 1

| FIG.5D | FIG.5C | FIG.5B | FIG.5A |

INVENTOR

CHARLES T. CASALE II

BY Cushman, Darby & Cushman
ATTORNEYS

United States Patent Office 3,180,975
Patented Apr. 27, 1965

3,180,975
BINARY COUNTER
Charles T. Casale II, Minneapolis, Minn., assignor to Sperry Rand Corporation, New York, N.Y., a corporation of Delaware
Filed Jan. 24, 1961, Ser. No. 84,585
30 Claims. (Cl. 235—92)

This invention relates to a binary counter with provisions for changing the binary count in the counter by decimal one, and more particularly to a binary counter which has means for incrementing or decrementing its count by decimal one in two phase times.

Counters of the sort above indicated have many uses among which is their employment in data processing systems such as computers for the purpose of providing outputs which successively are different by plus or minus decimal one to indicate the next address for a stored program for example. Generally, a program address counter is updated by decimal one once each cycle to give the new address for the next program, though it may be down-dated by decimal one or otherwise changed up or down to a given decimal number for purposes of obtaining from the computer memory a given jump instruction. In the counter described in this application, provision is not herein made for changing the contents of the counter by more than decimal one. However, obviously, such a provision may be added by those of ordinary skill in the art without departing from the scope of this invention.

The speed of changing the contents of a binary counter in computers and other equipment has become more and more important as other elements in computers or data processing systems have been made faster in operation. By the present invention, it is possible to change the contents of a binary counter by decimal one in two clock or phase times as compared with four phase times heretofore required and this without increasing the amount of equipment necessary in the counter. In other words, by using the same amount of hardware as is employed in existing 15 bit counters for example, and using the same clock rate, a 15 bit counter can be constructed in accordance with this invention to count in one-half the time previously required.

It is therefore one of the main objects of this invention to decrease substantially the amount of time required to change the count in a binary counter by decimal one.

Another object of this invention is the provision of a binary counter which has means for at least temporarily storing a plurality of binary signals representing a given binary number to be changed as in the previous object, along with means for combining certain of those binary signals into at least one signal representing a logical Nor function, plus means for combining certain of those binary signals into at least one signal representing a logical And function, and means for effectively combining all of the binary, Nor, and And signals into a plurality of binary signals which represent the changed binary number.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 5 shows how FIGURES 5A, 5B, 5C, and 5D are to be placed together in an end-to-end arrangement to illustrate a 15-stage binary counter in accordance with this invention and, FIGURE 6 shows a modification of the first two stages of the FIGURE 5 counter.

Figure 1:
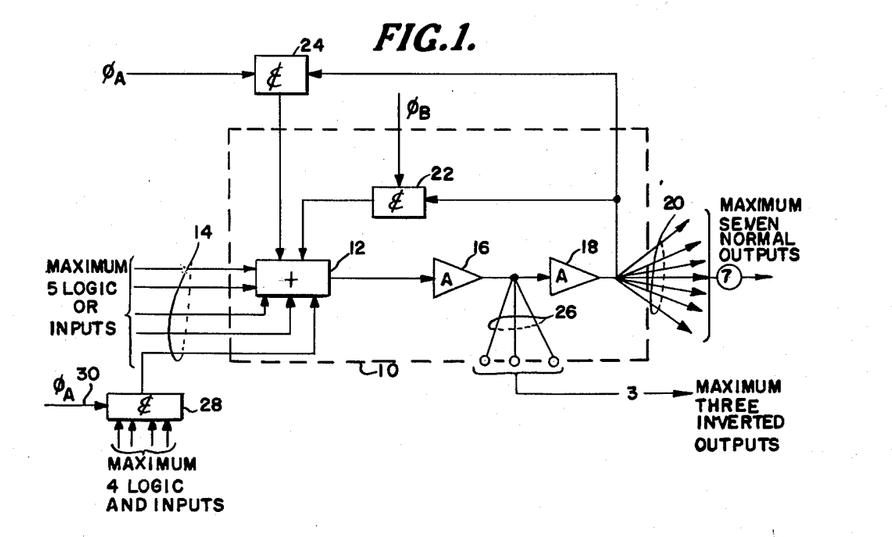
FIGURE 1 illustrates circuitry representing a logical element useable in the present invention.
Figure 2:
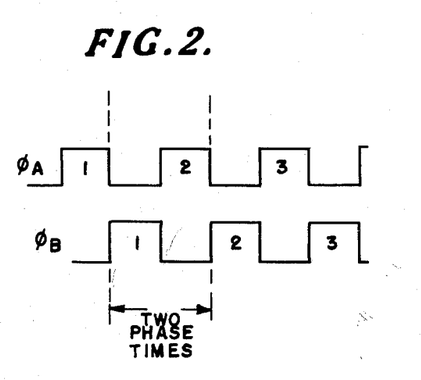
FIGURE 2 illustrates two series of non-overlapping phasing pulses.

Preferably, though not necessarily, the binary counter of this invention uses a plurality of logical elements of the type disclosed and claimed in the copending Cray application, Serial No. 855,188, filed November 24, 1959. Such a logical element is illustrated in FIGURE 1 of the present application within the dash line 10. Briefly, the circuitry operates such that when a pulse is delivered to Or circuit 12 via any one or more of the input lines 14, the Or circuit provides a pulse output to amplifier 16. This amplifier inverts a pulse and applies the inverted pulse to amplifier 18, causing an output signal on each of the seven output lines 20 for the duration of the pulse. The output of amplifier 18 is also applied back to Or circuit 12 via And circuit 22 which is gated by a timing signal $\phi_B$. If the original pulse via one or more of lines 14 was gated to Or circuit 12 by a timing pulse of phase $\phi_A$ with the $\phi_A$ and $\phi_B$ pulses being as indicated in FIGURE 2, the output from Or circuit 12 due to an input from And circuit 22 maintains a signal on lines 20 for a second phase time since there is inherently some delay in amplifiers 16 and 18, all as explained in the above-mentioned Cray application. When the timing pulse $\phi_B$ ends, the output on lines 20 will cease if there is no input to Or circuit 12 at that time. Nevertheless, with one regenerative cycle by the first $\phi_B$ pulse, the logic input is at least temporarily stored. If it is desired to maintain a signal on lines 20 corresponding to the logic of the pulse or pulses applied at one or more of lines 14, for more than two phase times, the output of amplifier 18 may also be gated back to Or circuit 12 via And circuit 24 by timing pulses of phase $\phi_A$. In other words, the internal feedback circuit including And circuit 22 will maintain the output for an additional phase time, and the external feedback circuit including And circuit 24 will maintain the output for still another phase time. As long as the timing pulses $\phi_A$ and $\phi_B$ are recurrent as indicated in FIGURE 2, any logic input will continue to be provided on lines 20 until one or the other of the timing pulses ceases to recur.

For purposes of describing this invention and in order to aid in the realization of why certain connections are made, it may be assumed that Or circuit 12 has a maximum capacity of five logic Or inputs, that the maximum number of normal or uncomplemented outputs as available from amplifier 18 is seven (one for each line 20), and that the maximum number of inverted or complemented (Not) outputs from amplifier 16 is three as indicated by the three lines 26. A further assumed limitation is that the sum of the number of logical Or inputs, inverted outputs, and normal outputs must not exceed ten for any one logical element. Additionally, it may be assumed that the And circuits which are utilized in this invention may have a maximum capability of four logic inputs, such as shown for And circuit 28. This maximum number of logic And inputs does not include the timing input 30.

It should be understood that the limitations set forth in the last above paragraph are exemplary, and that the invention herein is not necessarily limited thereby.

Figure 3:
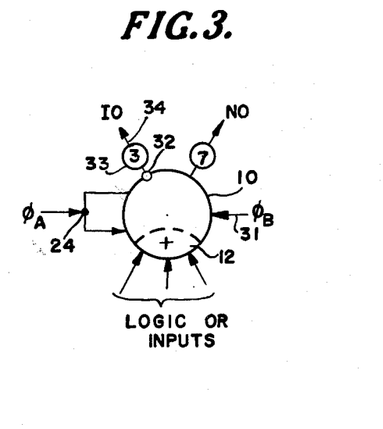
FIGURE 3 is a shorthand symbol for a part of the circuitry illustrated in FIGURE 1.

The logical element 10 of FIGURE 1 appears in the other figures of this application as a circular element as shown in FIGURE 3, with a dash line half moon and a plus sign indicating Or circuit 12 which receives the logic Or inputs. The phase of the internal timing pulses to And circuit 22 in FIGURE 1 is shown in FIGURE 3 merely by a phase designated arrow 31 to the perimeter of the circular element 10. As indicated in both FIGURES 1 and 3, these pulses are of phase $\phi_B$, but as will become apparent, the internal phasing may be by $\phi_A$ pulses whenever the logic Or inputs are timed by $\phi_B$ pulses. The external feedback circuit of FIGURE 1, which includes And circuit 24, is schematically illustrated in FIGURE 3 with dot 24 representing the And circuit. This dot type of And circuit representation is used hereinafter whenever timing pulses to an And circuit gates no more than just one input signal. Whenever two or more input signals are to be gated by a timing pulse, regardless of which phase it may be, the And circuit involved is shown in box form similar to And circuit 28 of FIGURE 1.

The inverted outputs from the logical element 10 in both FIGURES 1 and 3 are indicated by a small circle 32 intersecting the larger circle representing element 10. That is, circle 32 in FIGURE 3 indicates that any output signal on line 34 is an inversion, binary complement, or logical Not of the logic Or input. All normal output lines connect directly to the perimeter of circle 10 without any smaller circle 32 intervening.

Whenever more than one inverted outputs are taken from a logical element 10 at the same time, more than one output line is used for that purpose. In FIGURE 3, the number "3" within circle 33 indicates there are three output lines (as lines 26 in FIGURE 1) for carrying inverted outputs. Similarly, the number of output lines which simultaneously carry normal or uncomplemented outputs is designated by a circle with that number inside it. Whenever an output line of either type does not contain an encircled number, it may be assumed that there is only one conductor in that line unless obviously there are more.

Figure 4:
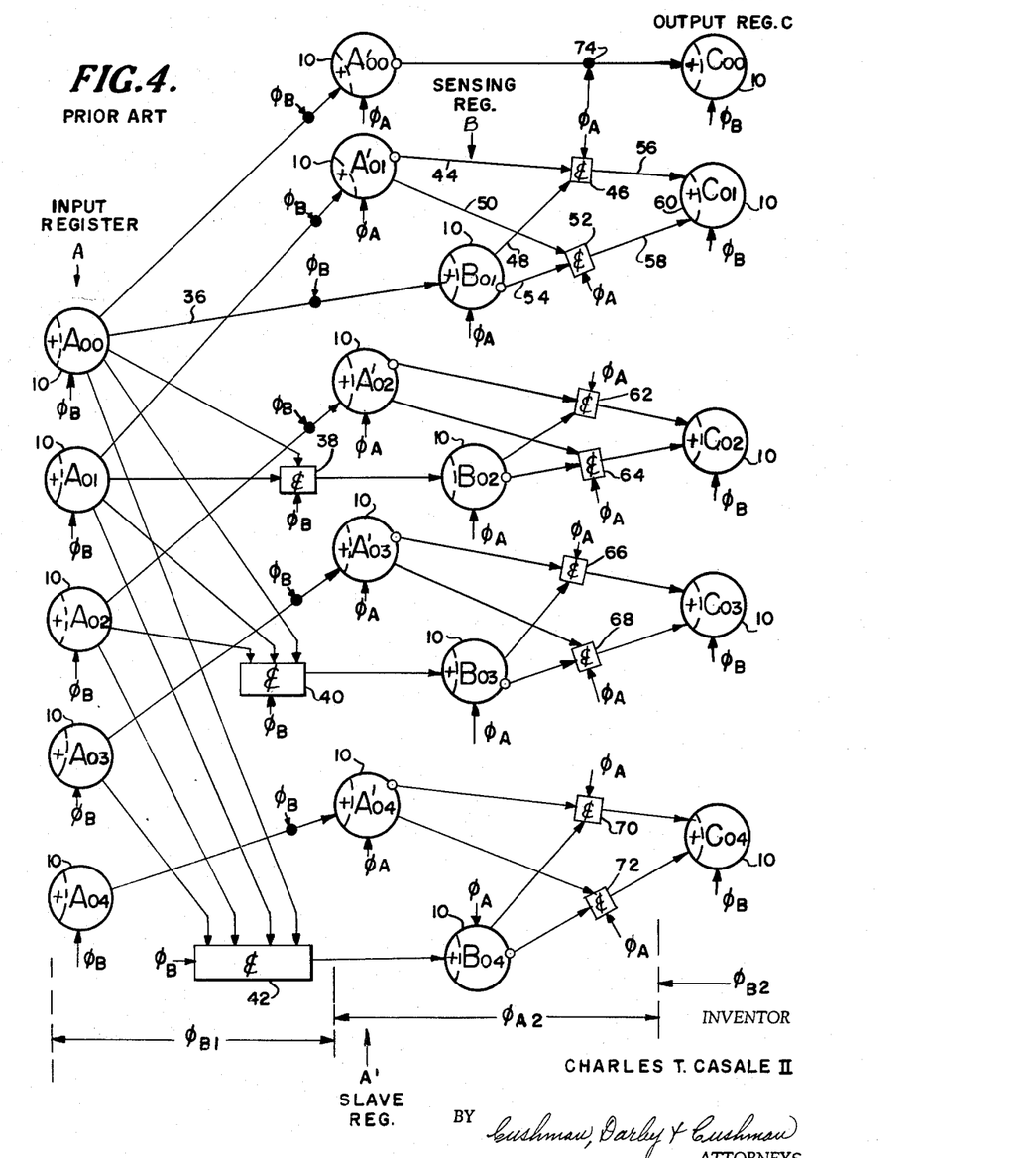
FIGURE 4 shows a prior art five-stage counter for purposes of demonstrating limitations in the logical arrangement thereof.

As an example of a binary counter which may employ logical elements of the type shown in FIGURES 1 and 3, reference is made to FIGURE 4. It may be immediately noted that none of the large, circular, logical elements 10 in FIGURE 4 employs any external feedback. That is, the external $\phi_A$ timed And circuit 24 of FIGURES 1 and 3 is not utilized in FIGURE 4 with any of the logical elements. Use is made of the external feedback circuit however in later figures in this application.

The counter shown in FIGURE 4 has five binary stages 00 . . . 04, and any binary number permanently or temperarily stored in the input register A may be changed by decimal one in two phase times. That is, if the internal feedback of the logical elements in the input register is gated by the $\phi_B$ timing pulses, for example by $\phi_{B1}$, then the changed binary number is available for example in the output or sum register C during the next $\phi_B$ phase time ($\phi_{B2}$) with only the $\phi_{A2}$ phase time intervening.

In detail, the counter of FIGURE 4 operates to increment or update the binary number in the input register A by decimal one in the following manner. Generally, the normal outputs of the A register logical elements 10 are applied respectively to the five stages of a slave register A'. Each of the outputs from the A register is timed enroute to the slave register by $\phi_B$ pulses. Accordingly, the respective Or circuits in the slave register A' receive the input register outputs during a $\phi_B$ phase time, and the internal feedback of each of the slave register logical elements is timed by $\phi_A$ pulses.

Along with applying the outputs of the input register A to the slave register A', the A register outputs are also applied in certain combinations to a sensing register B. This register requires only four logical elements $B_{01}$, $B_{02}$, $B_{03}$, and $B_{04}$. As may be noted, the inputs to the respective Or circuits in the sensing register B are timed by $\phi_B$ pulses. The normal output on line 36 from element $A_{00}$ is applied directly to the $B_{01}$ sensing register element. However, the $B_{02}$ sensing register element receives the result of intervening And circuit 38 which has as logic inputs the normal outputs of both the input register elements $A_{00}$ and $A_{01}$. The input And circuit 40 for the element $B_{03}$ of the sensing register provides an output only when the $A_{00}$, $A_{01}$, $A_{02}$ normal outputs are all binary 1's. In a similar manner the input And circuit 42 for the $B_{04}$ sensing register element provides an input thereto only when the four lower stage input registers all contain a binary 1. Since the input to any logical element 10 of the B register is during phase B, the internal feedback path of each B register elements is timed by the $\phi_A$ pulses.

Since in incrementing a binary number by decimal one the least significant digit needs only to be inverted, the inverted output of slave register $A'_{00}$ is applied directly to the Or input circuit in the output element $C_{00}$ with a $\phi_A$ timing. For the other four stages, however, both inverted and normal outputs from the slave and sensing registers are employed and Anded to provided the necessary Or inputs to the respective C register elements. For example, the inverted output from slave element $A'_{01}$ as it appears on line 44 is Anded in circuit 46 with the normal output as it appears on line 48, from the sensing element $B_{01}$. In a similar manner, the normal output from element $A'_{01}$ on line 50 is Anded in circuit 52 with the inverted output on line 54 from the sensing element $B_{01}$. Both And circuits 46 and 52 are timed by $\phi_A$ pulses, so that the inputs on their respective output lines 56 and 58 are applied to the Or circuit 60 in element $C_{01}$ during phase A times. This means that the internal phasing of element $C_{01}$ must be accomplished by $\phi_B$ pulses, as illustrated.

The normal and inverted outputs of the other slave and sense register elements for a given stage are combined in a similar manner to provide the Or inputs for their associated output register C element. That is, the inverted output of $A'_{02}$ and the normal output of $B_{02}$ are applied to element $C_{02}$ via And circuit 62, while the normal output of $A'_{02}$ and the inverted output of $B_{02}$ are applied thereto via And circuit 64. And circuit 66 receives the inverted output from $A'_{03}$ along with the normal output from $B_{03}$, while circuit 68 Ands the normal output from $A'_{03}$ with the inverted output from $B_{03}$. In like manner, And circuit 70 receives the inverted output from $A'_{04}$ along with the normal output from $B_{04}$, while And circuit 72 does the reverse thereof.

Figure 5:
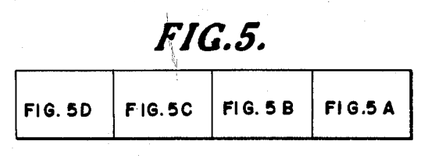

As above indicated, with the circuit of FIGURE 5, a binary number, for example 00111 (least significant digit on the right) is incremented by decimal one with the resultant (01000, in keeping with the example) being available in the output register C in two phase times. It should be understood that in FIGURE 4, as well as in the counter circuits later herein described, that the outputs of the And circuits 74, 46, 52, 62, 64, 66, 68, 70, and 72 may be applied back into the respective stage Or circuits of the input register A, this being the preferable mode of operation for the FIGURE 4 circuitry. In other words, the output register C is actually preferably register A, and not a separate register.

With the circuit of FIGURE 4, it becomes apparent upon analyzing the progression of the number of inputs to successive And circuits which feed the sensing register, for example And circuits 38, 40 and 42, that for each additional stage in the counter, additional logic input must be available in the And circuit. Since one of the limitations above mentioned for the And circuits for this invention is that they have a maximum capacity of four logic inputs, it is apparent that a counter logically arranged as in FIGURE 4 can have no more than five stages since addition of a sixth stage would require that the associated And circuit providing the input to the sixth stage sensing element would need to have five logical inputs. For N stages in a counter of the FIGURE 4 type the maximum number of logic inputs to the last stage And circuit may generally be expressed as $(N-1)$. When N is greater than five, this quantity is too great. In the past, this problem has been obviated by a "fanning out" type arrangement, providing a counter of more than five stages with no And circuit having more than four logic inputs. However, such a counter requires four phase times for incrementation. According to the present invention, however, incrementation by decimal one of a more-than-five-digit binary number can be effected in two phase times without any And circuit having more than four logic inputs and without increasing the amount of required equipment. In general, the maximum number of logic inputs to any And circuit in a counter built in accordance with this invention is $(N-P)$ where N is the number of stages and P is an integer greater than one but less than N.

A counter constructed in accordance with this invention with the quantity $(N-P)$ equal to four and the number of stages N equal to fifteen is illustrated in FIGURES 5A, 5B, 5C, and 5D which may together be thought of as FIGURE 5 since they go together as shown in FIGURE 5 to make up the whole counter.

In FIGURE 5, the input register, i.e., the register which at least temporarily stores the binary number to be incremented, includes each of the 15 logical elements $A_{00} \ldots A_{14}$. In this specific embodiment, the input register also includes logical elements $A°_{00} \ldots A°_{11}$ for purposes which will hereinafter become more apparent. One logical Or input of each of these elements in the input register is utilized to receive the respective binary signal representing the binary digit (bit) of the associated stage. These binary signals are originally applied to the respective stage input lines 100 of which there is one for each stage, and are gated to the input register logical elements A and A° by $\phi_A$ timing pulses. The internal phasing of each of the input register elements A and A° is by $\phi_B$ pulses.

Besides the duplication of the temporarily stored signal in each of the A elements by each of the A° elements, there is also included in the counter of FIGURE 5 a slave register comprising 15 logical elements $A'_{00} \ldots A'_{14}$, which effectively store the same signal as on the associated stage input line 100 since in each instance it will be noted that the input to the internal Or circuit of each A' element is the normal output of the respective A element of the input register. Each of the A' element inputs are timed with $\phi_B$ pulses, and the internal feedback timing for the A' elements is by $\phi_A$ pulses. In addition, each of the A' slave register elements is illustrated as having an external feedback path which is timed by $\phi_B$ pulses. As above explained, this external feedback operates in conjunction with the internal feedback to store the signal in the elements for as long as both the $\phi_A$ and $\phi_B$ pulses continue to recur. As soon as one or the other of these strings of pulses is stopped, storage of the instant signal in an A' element ceases. It is to be understood that the external feedback path for each of the slave register A' elements is not essential for this invention, but may be employed if desired for whatever advantage such may have in using the counter with other equipment. If the external feedback paths are employed, it is desirable at times to clear or destroy the instantly stored information in each of the A' elements, as at the beginning or before an incrementation of the contents in the input register is started. This can be conveniently done by stopping the $\phi_B$ pulse series temporarily, for example by inhibiting one of the $\phi_B$ pulses, by means not shown.

Also included in the counter of FIGURE 5 is a sensing register which includes 15 logical elements $B_{00} \ldots B_{14}$. Any input to the internal Or circuit of each of these B elements is effectively timed by a $\phi_B$ pulse, and the internal feedback paths of the B elements are timed by $\phi_A$ pulses. The signal stored in some of these B elements is effectively a duplicate of the signal originally on the associated line 100. For example, it may be noted that the $B_{00}$ element receives in its Or circuit only the normal output of the $A_{00}$ element. Consequently, the normal output of $B_{00}$ is the same as the normal output of $A_{00}$, which in turn is the same as the input signal on line 100 to the $A_{00}$ element. However, the signal stored by other B elements is not necessarily the same as stored by its associated A element. For example, the $B_{01}$ element has 3 inputs to its Or circuit which are respectively inverted outputs of the $A_{00}$, $A_{01}$, $A_{02}$ input register elements. As a further example, the input to the Or circuit of sensing element $B_{02}$ is from And circuit 102 which in turn receives three inputs which are respectively the normal outputs of elements $A_{00}$, $A_{01}$ and $A_{02}$, plus a timing signal of phase B. In both of these examples, it is apparent that the signal stored by the $B_{01}$ and $B_{02}$ sensing elements is not effectively a duplicate of the respective signals stored in the $A_{01}$ and $A_{02}$. As a matter of fact, the signal stored in the $B_{01}$ element may be logically expressed as a Nor signal since it is the result of Oring the inverted or logical Not signals from the $A_{00}$, $A_{01}$ and $A_{02}$ elements. In a similar manner, the signal stored in the $B_{02}$ sensing element is the result of Anding the normal outputs of the $A_{00}$, $A_{01}$, and $A_{02}$ input register elements. Consequently, the normal outputs of the $B_{01}$ and $B_{02}$ sensing elements may be considered as Nor and And signals respectively. On the other hand, if element $B_{01}$ had an inverted output (which it does not, but which element $B_{04}$ for example does and likewise receives in its internal Or circuit several different Not signals) the inverted output of $B_{01}$ can be considered a Nor-Not signal. Similarly, the inverted output on line 104 of sensing element $B_{02}$ may be considered an And-Not signal.

Figure 5A:
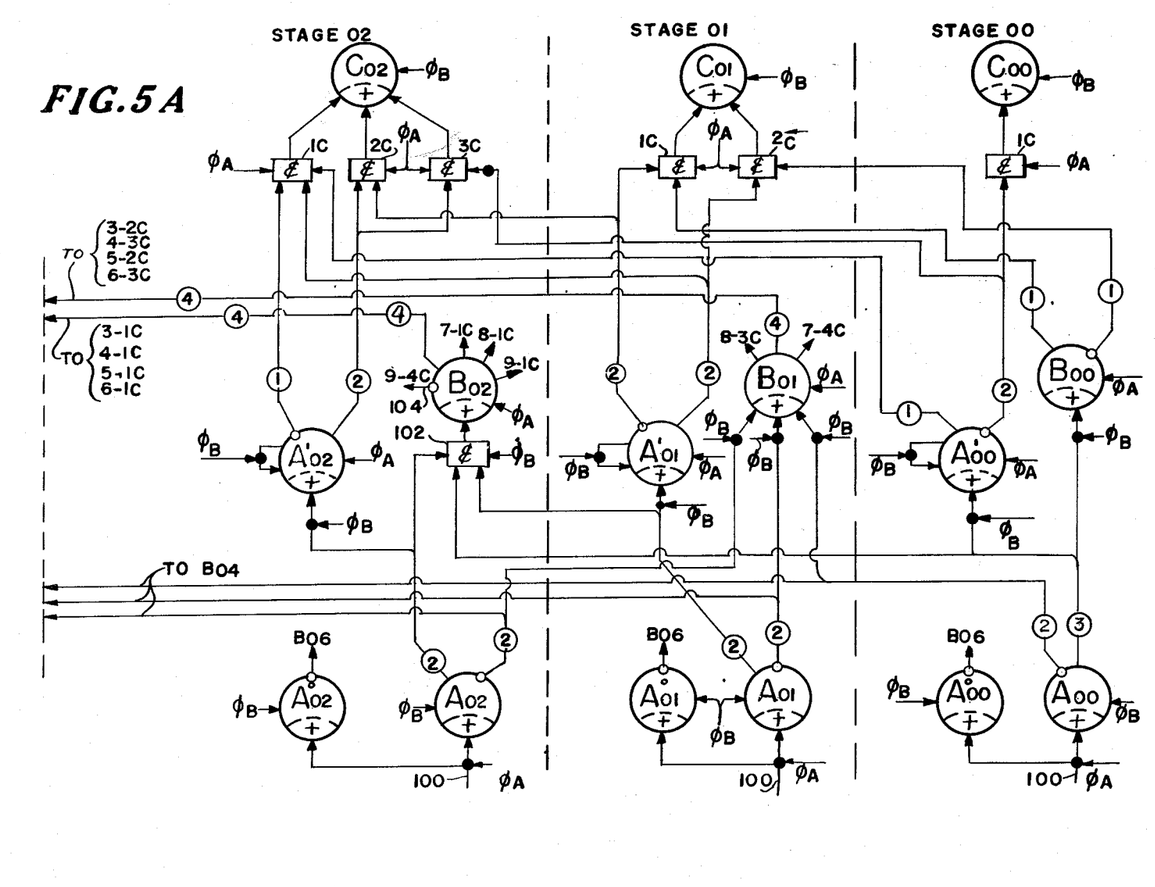
Figure 5B:
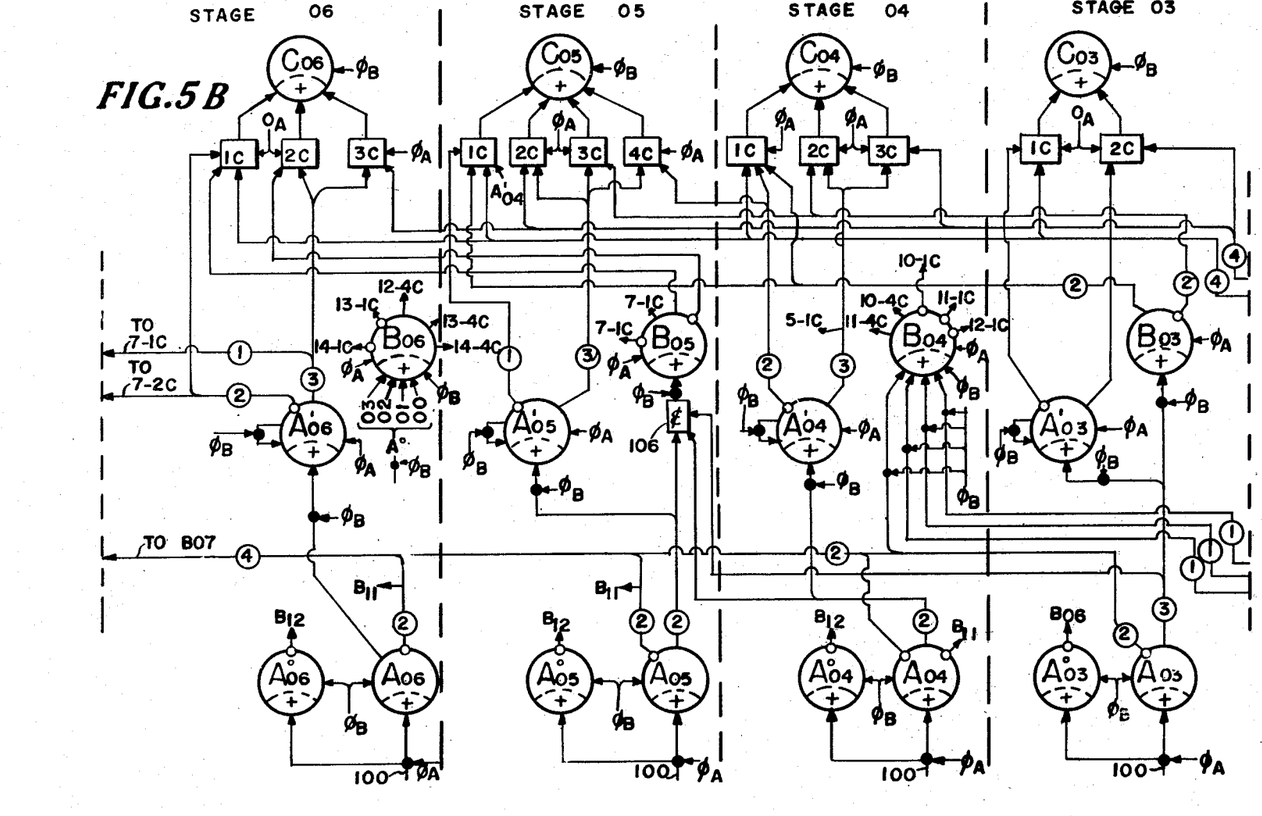
Figure 5C:
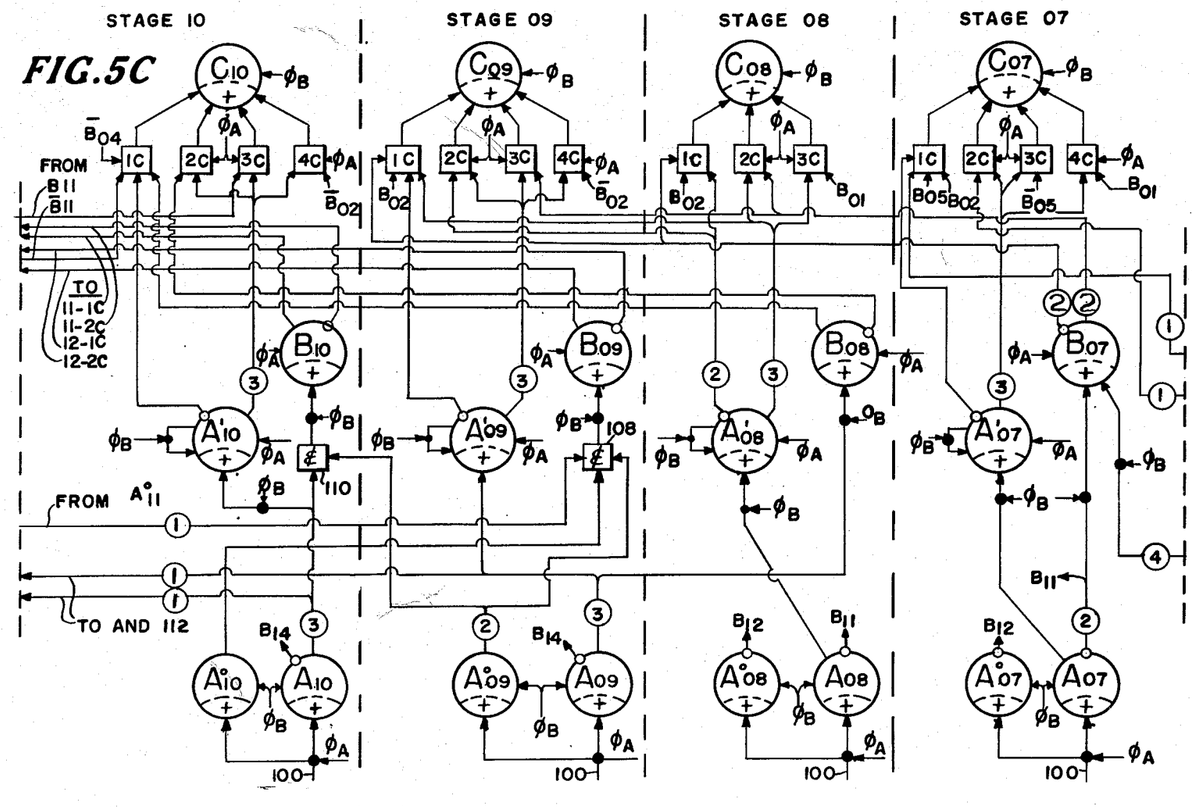
Figure 5D:
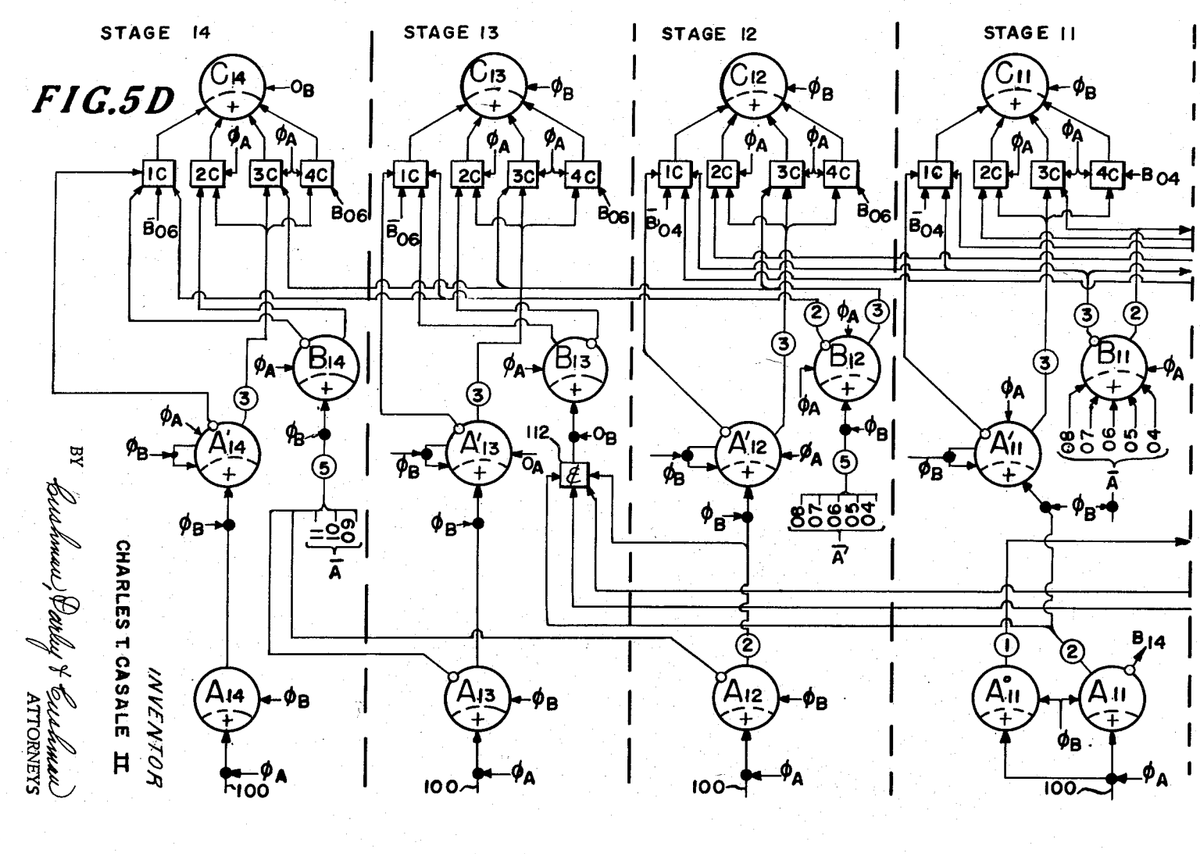

As illustrated in FIGURE 5, the binary counter may also include a separate output register including logical elements $C_{00} \ldots C_{14}$. The input or inputs to the respective Or circuits in each of these logical elements is from a respective one or more And circuits. The combination of the AND circuits providing OR inputs to the logical elements $C_{00} \ldots C_{14}$ can be considered for the purposes of this specification and the claims as ANDING-OR means. In FIGURE 5A, these And circuits are represented by a rectangular box with an ampersand sign (&) inside it. In addition, each of these And circuits is designated by a number preceding the letter C. Where the number of And circuits in a particular stage is greater than one, the left hand And circuit is designated "1C," with the next And circuit to the right in the same stage being designated 2C, etc. In order to simplify the illustrations, the similarly disposed And circuits in FIGURES 5B, 5C, 5D do not contain the ampersand sign, but instead contain the 1C, 2C, etc. designation. Whenever an output from an A' or B logical element serves as an input to one of these And circuits and the output line is not drawn directly to that And circuit but has a designation associated therewith, the first number in the designation indicates the stage number, while the latter part of the designation (that after the hyphen) indicates to which of the C designated And input circuits that particular output goes. For example, one of the outputs sensing $B_{01}$ is designated "7-4C." On looking at FIGURE 5C which contains stage 07 of the counter, it will be noted that the And circuit designated 4C in stage 7 has an input from element $B_{01}$. Similar designations are made in other parts of FIGURE 5. The combination of the AND circuits providing OR inputs to the logical elements $C_{00} \ldots C_{14}$ can be considered for the purposes of this specification and the claims as ANDING-OR means.

In prior art binary counters, the circuitry first determines what bits of the stored binary number need to be changed to increment that binary number by decimal one and then proceeds to change those bits. The counter of FIGURE 5 (as well as that of FIGURE 4) utilizes not only the conditions for change, but also the conditions for not changing bit values. The entire sets of these two conditions are, for any given counter of base $2^n$, mutually exclusive and totally inclusive for a total of $2^n$ unique values. If there exists then a listing of the $2^n$ values that a counter may assume, the counting function can be implemented by looking at the value, determining where it lies in the list, and selecting the next value on the list. Counting then becomes a matter of table look-up. On considering this on a bit basis, it can be seen that any given bit can be described as the $k$th bit in a counter, so that all bits of value $2^{k+1}$ and greater can be ignored in in determining the value of the bit $2^k$. For any bit, then, it is apparent that it will be a binary 1 after the whole binary word has been incremented by decimal one under the following conditions: (1) that bit was a 0 and all lower order bits were both 1, (2) that bit was a 1 and any one of the lower order bits was 0.

Since there is no concern about the bits higher than the particular stage of interest, the generalized logical expression for the $k$th stage is as follows:

$$C_k = \overline{A}_k(A_{k-1}A_{k-2} \ldots A_{k-k})$$
$$+ A_k(\overline{A}_{k-1} + \overline{A}_{k-2} + \ldots \overline{A}_{k-k})$$

wherein any A and its binary logical Not equivalent $\overline{A}$ with their respective stage subscripts effectively refer to that stage's binary signal of the binary number stored in the input register elements A or A°, or in the slave register elements $A'_2$, or any combination of these. In FIGURE 5, the number of input And circuits to any one of the output elements C is limited to a maximum of four in keeping with the limitation that the maximum number of Or inputs to any one logical element is five, one of the Or inputs being reserved to load the element initially. In other words, this refers to what was above indicated relative to FIGURE 4, that the output register C can be, and preferably in accordance with this invention is, the same register as the input register as it consists of elements $A_{00} \ldots A_{14}$. This means that in the preferred embodiment, the $A_{00}$ and $C_{00}$ elements for example are one and the same element instead of being different elements as indicated in FIGURE 5. With the limitation that the maximum number of And circuits which provide respective inputs to the single Or circuit within a C element being four, the maximum logical expression for any stage of the counter in FIGURE 5 is in the form of:

$$C_k = \overline{A}_k(XYZ) + A_k(\overline{X}) + A_k(\overline{Y}) + A_k(\overline{Z})$$

In this latter equation, X is the equivalent of one or more of the Anded $A_{k-1}$ etc. terms in the other above equation, Y is one or more of others of those terms, and Z is the combination of the remainder of those terms. $\overline{X}$, $\overline{Y}$, and $\overline{Z}$ are related respectively to the X, Y, and Z signals in accordance with one of the following:

(1) Logical Not of same signal,
(2) Logical Not of duplicate signal, and
(3) De Morgan equivalent.

The "De Morgan" equivalent just referred to has reference to the two Boolean identities generally known as De Morgan's Theorem, or Law, which says:

$$\overline{X+Y} = \overline{X}\,\overline{Y}$$

or $$\overline{XY} = \overline{X} + \overline{Y}$$

Equivalencies of the De Morgan type are employed liberally in constructing the counter shown in FIGURE 5, and examples thereof are pointed out hereinbelow.

With the above information, and in view of FIGURE 5A, it is apparent that generally, updating by demical one involves only the inverted of the signal stored by element $A_{00}$. In the particular stage 00 equipment illustrated, this is accomplished by storing in slave element $A'_{00}$ the normal of the signal in the $A_{00}$ input element, and applying to the 1C And circuit in this stage the complement of the signal stored in element $A'_{00}$. This means that in equation form, $$C_{00} = \overline{A}'_{00}$$

Of course, broadly speaking, $$C_{00} = \overline{A}_{00}$$

since $$A'_{00} = A_{00}$$

and $$\overline{A}'_{00} = \overline{A}_{00}$$

For stage 01, $$C_{01} = \overline{A}'_{01}(B_{00}) + A'_{01}(\overline{B}_{00})$$

In effect, the last above equation says:

$$C_{01} = \overline{A}_{01}(A_{00}) + A_{01}(\overline{A}_{00})$$

since $B_{00}$ is the same signal as $A_{00}$ and $\overline{B}_{00}$ is effectively a duplicate of the $\overline{A}_{00}$ signal.

Before proceeding further with the C register output equations, the logical expressions which exactly reflect the outputs obtainable from the different B elements in the sensing register, and which are utilized in the C equations, are now set forth:

$$B_{00} = A_{00}$$
$$\overline{B}_{00} = \overline{A}_{00}$$
$$B_{01} = \overline{A}_{02} + \overline{A}_{01} + \overline{A}_{00}$$
$$B_{02} = A_{02}A_{01}A_{00}$$
$$\overline{B}_{02} = \overline{A_{02}A_{01}A_{00}}$$
$$B_{03} = A_{03}$$
$$\overline{B}_{03} = \overline{A}_{03}$$
$$B_{04} = \overline{A}_{03} + \overline{A}_{02} + \overline{A}_{01} + \overline{A}_{00}$$
$$\overline{B}_{04} = \overline{\overline{A}_{03} + \overline{A}_{02} + \overline{A}_{01} + \overline{A}_{00}}$$
$$B_{05} = A_{05}A_{04}A_{03}$$
$$\overline{B}_{05} = \overline{A_{05}A_{04}A_{03}}$$
$$B_{06} = \overline{A}°_{03} + \overline{A}°_{02} + \overline{A}°_{01} + \overline{A}°_{00}$$
$$\overline{B}_{06} = \overline{\overline{A}°_{03} + \overline{A}°_{02} + \overline{A}°_{01} + \overline{A}°_{00}}$$
$$B_{07} = \overline{A}_{07} + \overline{A}_{06} + \overline{A}_{05} + \overline{A}_{04} + \overline{A}_{03}$$
$$\overline{B}_{07} = \overline{\overline{A}_{07} + \overline{A}_{06} + \overline{A}_{05}\overline{A}_{04} + \overline{A}_{03}}$$
$$B_{08} = A_{09}$$
$$\overline{B}_{08} = \overline{A}_{09}$$
$$B_{09} = A°_{11}A°_{10}A°_{09}$$
$$\overline{B}_{09} = \overline{A°_{11}A°_{10}A°_{09}}$$
$$B_{10} = A_{10}A°_{09}$$
$$\overline{B}_{10} = \overline{A_{10}A°_{09}}$$
$$B_{11} = \overline{A}_{08} + \overline{A}_{07} + \overline{A}_{06} + \overline{A}_{05} + \overline{A}_{04}$$
$$\overline{B}_{11} = \overline{\overline{A}_{08} + \overline{A}_{07} + \overline{A}_{06} + \overline{A}_{05} + \overline{A}_{04}}$$
$$B_{12} = \overline{A}°_{08} + \overline{A}°_{07} + \overline{A}°_{06} + \overline{A}°_{05} + \overline{A}°_{04}$$
$$\overline{B}_{12} = \overline{\overline{A}°_{08} + \overline{A}°_{07} + \overline{A}°_{06} + \overline{A}°_{05} + \overline{A}°_{04}}$$
$$B_{13} = A_{12}A_{11}A_{10}A_{09}$$
$$\overline{B}_{13} = \overline{A_{12}A_{11}A_{10}A_{09}}$$
$$B_{14} = \overline{A}_{13} + \overline{A}_{12} + \overline{A}_{11} + \overline{A}_{10} + \overline{A}_{09}$$
$$\overline{B}_{14} = \overline{\overline{A}_{13} + \overline{A}_{12} + \overline{A}_{11} + \overline{A}_{10} + \overline{A}_{09}}$$

From the foregoing equations for the respective sensing register output elements, several things may be noted among which is, as above indicated, the $B_{01}$ normal output (without a bar over the letter) is a Nor signal as is the $B_{04}$ signal, while $\overline{B}_{04}$ is a Nor-Not signal since it represents the inversion or complement of several Not signals which have been Ored. Further, as previously indicated, the normal output of element $B_{02}$ is an And signal, while the inverted or complemented output therefrom as represented in the above equations by $\overline{B}_{02}$ is the binary logical Not of the $B_{02}$ signal; in other words, an And-Not signal. It may also be noted that only the $B_{02}$, $B_{05}$, $B_{09}$, $B_{10}$, and $B_{13}$ logical elements receive an And circuit output as their respective Or inputs. That is, as previously indicated, element $B_{02}$ has And circuit 102 preceding it. For element $B_{05}$, the output of And circuit 106 is its Or circuit input, while the outputs of And circuits 108, 110, and 112 respectively feed the internal Or circuits in sensing elements $B_{09}$, $B_{10}$, and $B_{13}$. These sensing elements which are preceded by an And circuit receive only a single logic signal to their respective internal Or circuits, while the remainder of the sensing elements, except $B_{00}$, $B_{03}$, and $B_{08}$, receive a plurality of logic inputs to their respective internal Or circuits. Accordingly, the normal outputs from sensing elements $B_{02}$, $B_{05}$, $B_{09}$, $B_{10}$, and $B_{13}$ are effectively Anded signals, while the inverted or complemented outputs therefrom are And-Not signals.

With the foregoing sensing register output signals in mind, and remembering that the outputs of the different slave register elements A' may be complemented or non-complemented so as to be representable respectively by an $\overline{A}'$ or A', the following equations represent stage-by-stage the contents of the output register C after an incrementation by decimal one has occurred:

$C_{00} = \overline{A}'_{00}$
$C_{01} = \overline{A}'_{01}(B_{00}) + A'_{01}(\overline{B}_{00})$
$C_{02} = \overline{A}'_{02}(A'_{01}A'_{00}) + A'_{02}(\overline{A}'_{01}) + A'_{02}(\overline{A}'_{00})$
$C_{03} = \overline{A}'_{03}(B_{02}) + A'_{03}(B_{01})$
$C_{04} = \overline{A}'_{04}(B_{03}B_{02}) + A'_{04}(\overline{B}_{03}) + A'_{04}(B_{01})$
$C_{05} = \overline{A}'_{05}(A'_{04}B_{03}B_{02}) + A'_{05}(\overline{A}'_{04})$
$\qquad + A'_{05}(\overline{B}_{03}) + A'_{05}(B_{01})$
$C_{06} = \overline{A}'_{06}(B_{05}B_{02}) + A'_{06}(\overline{B}_{05}) + A'_{06}(B_{01})$
$C_{07} = \overline{A}'_{07}(A'_{06}B_{05}B_{02}) + A'_{07}(\overline{A}'_{06})$
$\qquad + A'_{07}(\overline{B}_{05}) + A'_{07}(B_{01})$
$C_{08} = \overline{A}'_{08}(\overline{B}_{07}B_{02}) + A'_{08}(B_{07}) + A'_{08}(B_{01})$
$C_{09} = \overline{A}'_{09}(A'_{08}\overline{B}_{07}B_{02}) + A'_{09}(\overline{A}'_{08})$
$\qquad + A'_{09}(B_{07}) + A'_{09}(\overline{B}_{02})$
$C_{10} = \overline{A}'_{10}(B_{08}\overline{B}_{11}\overline{B}_{04}) + A'_{10}(\overline{B}_{08}) + A'_{10}(B_{11}) + A'_{10}(B_{04})$
$C_{11} = \overline{A}'_{11}(B_{10}\overline{B}_{11}\overline{B}_{04}) + A'_{11}(\overline{B}_{10}) + A'_{11}(B_{11}) + A'_{11}(B_{04})$
$C_{12} = \overline{A}'_{12}(B_{09}\overline{B}_{11}\overline{B}_{04}) + A'_{12}(\overline{B}_{09}) + A'_{12}(B_{12}) + A'_{12}(B_{06})$
$C_{13} = \overline{A}'_{13}(B_{13}\overline{B}_{12}\overline{B}_{06}) + A'_{13}(\overline{B}_{13}) + A'_{13}(B_{12}) + A'_{13}(B_{06})$
$C_{14} = \overline{A}'_{14}(\overline{B}_{14}\overline{B}_{12}\overline{B}_{06}) + A'_{14}(B_{14}) + A'_{14}(B_{12}) + A'_{14}(B_{06})$ These C register equations can be correlated to the previously mentioned maximum logical expression $C_k$ as it involves X, Y, and Z, and the logical Nots thereof. For example, relative to the equation for $C_{02}$, it is apparent that $A'_{01}$ refers to X in the prior equation, with $\overline{X}$ being represented by $\overline{A}'_{01}$, Y by $A'_{00}$, and $\overline{Y}$ by $\overline{A}'_{00}$. Since $C_{02}$ involves stage 02, there are only two previous stages in the counter; therefore the equation for $C_{02}$ does not involve any Z or $\overline{Z}$ term. It should be apparent that these terms are also not involved in some of the other output equations, and that even some of the equations do not require a Y or $\overline{Y}$ term, for example the equation for $C_{03}$.

The $C_{03}$ equation is of interest since the X and $\overline{X}$ terms are not direct inversions of each other, i.e., $B_{01}$ is not the direct complement of $B_{02}$; they are not normal and complement outputs from the same sensing element. However, upon referring back to the equations for $B_{01}$ and $B_{02}$, it will be noted that the X, Y and Z terms are Anded to effect the $B_{02}$ signal, while the respective logical Not of each of the same X, Y, and Z signals ($\overline{A}_{02}$, $\overline{A}_{01}$, $\overline{A}_{00}$) are Ored to effect the $B_{01}$ signal. To prove that $B_{01} = \overline{B}_{02}$, one need only set down the Boolean identity of the $B_{01}$ expression in accordance with the second De Morgan law above given, i.e., $$B_{01} = \overline{A}_{02} + \overline{A}_{01} + \overline{A}_{00} = \overline{A_{02}A_{01}A_{00}} = \overline{B}_{02}$$

A similar type of situation exists for the resultant $C_{04}$ and $C_{05}$ signals.

To form the above $C_{06}$ equation De Morgan's theorem is employed. Since the generalized logical expression for $C_k$ above indicates that the right hand term in parenthesis includes:

$$\overline{A}_{05} + \overline{A}_{04} + \overline{A}_{03}$$

and there is no B sensing element which provides this resultant directly, equivalency therebetween and one of the available outputs of the sensing elements is sought. Since in accordance with the second De Morgan law above set forth, $$\overline{A}_{05} + \overline{A}_{04} + \overline{A}_{03} = \overline{A_{05}A_{04}A_{03}}$$

the $\overline{B}_{05}$ signal may be employed as the $\overline{X}$ term of the equation for $C_{06}$. The $B_{05}$ and $\overline{B}_{05}$ terms are actually related to one another by one being the logical Not of the other, but the Y and $\overline{Y}$ terms ($B_{02}$ and $B_{01}$) are related to each other as De Morgan equivalents as above explained.

To the effect that the X term in the maximum generalized expression previously given need not be a normal or non-complemented signal, but that the $\overline{X}$ term instead is, reference is made to the $C_{14}$ equation. In that equation, X, Y, and Z are respectively Nor-Not signals $\overline{B}_{14}$, $\overline{B}_{12}$, and $\overline{B}_{06}$, while the $\overline{X}$, $\overline{Y}$, $\overline{Z}$ signals are respectively just plain Nor signals $B_{14}$, $B_{12}$ and $B_{06}$. In any event, the X and $\overline{X}$ terms of the $C_{14}$ equation are related to one another such that one is the logical Not of the other. In this instance, the $\overline{B}_{14}$ signal is the logical Not of the same signal which constitutes the $B_{14}$ signal, though it could be a logical Not of a duplicate signal; which is to say that the $B_{14}$ signal itself may as well be made up of $\overline{A}^0$ or $\overline{A}'$ signals instead of $\overline{A}$ signals, while the $\overline{B}_{14}$ signal remains as expressed in the equation therefor above.

Since this invention is not restricted to the arbitrary limitations referred to above in relation to the number of inputs and outputs for the logical elements and associated And circuits, broadly the equations for the output C register may be in accordance with the following logical expressions:

$C_{00} = \overline{A}_{00}$
$C_{01} = \overline{A}_{01}(A_{00}) + A_{01}(\overline{A}_{00})$
$C_{02} = \overline{A}_{02}(A_{01}A_{00}) + A_{02}(\overline{A}_{01}) + A_{02}(\overline{A}_{00})$
$C_{03} = \overline{A}_{03}(B_{02}) + A_{03}(B_{01})$
$C_{04} = \overline{A}_{04}(A_{03}B_{02}) + A_{04}(\overline{A}_{03}) + A_{04}(B_{01})$
$C_{05} = \overline{A}_{05}(A_{04}A_{03}B_{02}) + A_{05}(\overline{A}_{04}) + A_{05}(\overline{A}_{03}) + A_{05}(B_{01})$
$C_{06} = \overline{A}_{06}(B_{05}B_{02}) + A_{06}(\overline{B}_{05}) + A_{06}(B_{01})$
$C_{07} = \overline{A}_{07}(A_{06}B_{05}B_{02}) + A_{07}(\overline{A}_{06}) + A_{07}(\overline{B}_{05}) + A_{07}(B_{01})$
$C_{08} = \overline{A}_{08}(\overline{B}_{07}B_{02}) + A_{08}(B_{07}) + A_{08}(B_{01})$
$C_{09} = \overline{A}_{09}(A_{08}\overline{B}_{07}B_{02}) + A_{09}(\overline{A}_{08}) + A_{09}(B_{07}) + A_{09}(\overline{B}_{02})$
$C_{10} = \overline{A}_{10}(A_{09}\overline{B}_{11}\overline{B}_{04}) + A_{10}(\overline{A}_{09}) + A_{10}(B_{11}) + A_{10}(B_{04})$
$C_{11} = \overline{A}_{11}(B_{10}\overline{B}_{11}\overline{B}_{04}) + A_{11}(\overline{B}_{10}) + A_{11}(B_{11}) + A_{11}(B_{04})$
$C_{12} = \overline{A}_{12}(B_{09}\overline{B}_{11}\overline{B}_{04}) + A_{12}(\overline{B}_{09}) + A_{12}(B_{11}) + A_{12}(B_{04})$
$C_{13} = \overline{A}_{13}(B_{13}B_{11}\overline{B}_{04}) + A_{13}(\overline{B}_{13}) + A_{13}(B_{11}) + A_{13}(B_{04})$
$C_{14} = \overline{A}_{14}(\overline{B}_{14}\overline{B}_{11}\overline{B}_{04}) + A_{14}(B_{14}) + A_{14}(B_{11}) + A_{14}(B_{04})$ wherein the different B and $\overline{B}$ signals are each as previously set forth in their respective logical expressions except that the following signals may be different:

$$B_{09} = A_{11}A_{10}A_{09}$$
$$\overline{B}_{09} = \overline{A_{11}A_{10}A_{09}}$$
$$B_{10} = A_{10}A_{09}$$
$$\overline{B}_{10} = \overline{A_{10}A_{09}}$$

In other words, broadly speaking, in accordance with the latter set of C output equations and B sensing register equations, it is apparent that this invention does not require an A' slave register at all, nor any of the input signal duplicating logical elements $A^0$, as long as the $A_{00} \ldots A_{14}$ logical elements can provide the required number of normal and inverted outputs.

Figure 6:
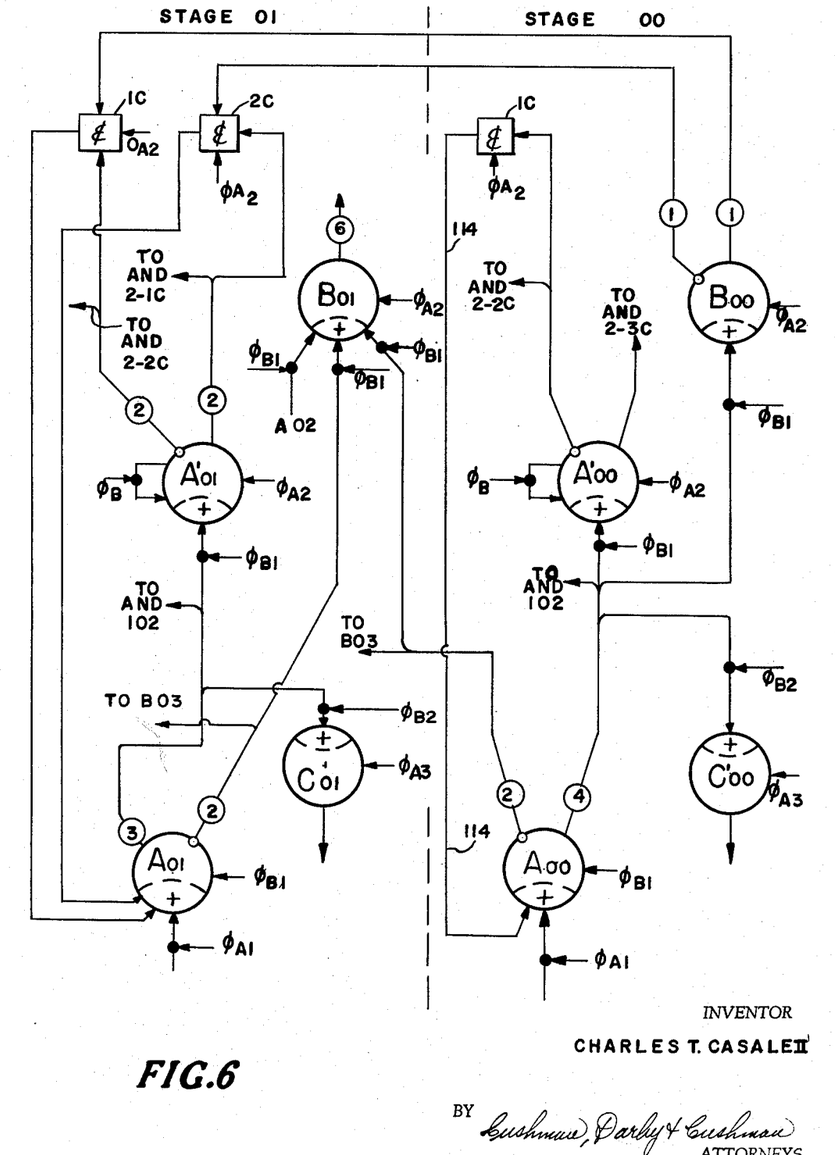

As previously indicated, it is preferable that the output and input registers are one and the same register, so that the amount of hardware is considerably reduced and the incremented number is available back in the input register itself as soon as two clock or phase times have expired. To illustrate this clearly, FIGURE 6 is included as representative of the first two stages of the 15-stage counter of FIGURE 5 modified. In FIGURE 6, it will be noted that the output of And circuit 1C in stage 00 is applied via line 114 back to the internal Or circuit of logical element $A_{00}$. Since this And circuit is timed with a $\phi_A$ pulse, the incremented signal in $A_{00}$ is available therefrom on the next $\phi_B$ pulse. In FIGURE 6, the incremented output of $A_{00}$ is applied during a $\phi_B$ time to the input of any utilization means, for example as to another logical element $C'_{00}$. Similarly, the outputs of And circuits 1C and 2C in stage 01 are applied back to the Or circuit within the input register element $A_{01}$, and the incremented bit therein is applied to the utilization element $C'_{01}$. The remainder of FIGURE 6 is similar to the corresponding stages in FIGURE 5 with the exception that no $A^0{}_{00}$ and $A_{01}$ elements are shown in FIGURE 6.

In operation, as previously indicated, decimal one incrementation of the binary number, which is at least temporarily stored in the input register A, is accomplished in just two phase times. This does not include the phase time which may be required to load the input register initially. That is, with reference to FIGURE 6, the phase time represented by $\phi_{A1}$ during which logic signals are applied to the A elements, is not counted. Starting with the A register filled with the binary number to be incremented, it is apparent that during the phase time $\phi_{B1}$, not only is the contents of the A register applied to the slave register elements, but also, and in parallel therewith during this same time, to the sensing register elements via And circuits where required, for example And circuit 102 in FIGURE 5A, so that the output signals from the slave and sensing register elements are available by the end of the $\phi_{B1}$ time. During the second phase time $\phi_{A2}$, the contents of the slave and sensing register elements are maintained available and gated through their respective And circuits by a $\phi_{A2}$ timing pulse back into the associated A register elements, making the incremented binary number available therein immediately so that it is possible to gate out that number into the respective C' elements during the third phase time $\phi_{B2}$. From the foregoing, it is then apparent that all of the A' and B signals are formed during a first phase time ($\phi_{B1}$), and all of the resultant C signals for the respective C output register elements in FIGURE 5, or for the input back into the internal Or circuits of the respective input register elements A, are formed during the immediately following second phase time ($\phi_{A2}$).

As previously indicated, the second Or $A^0$ logic elements in the input register are not required as long as the A elements therein can provide sufficient normal and inverted outputs. With the limitation above set forth as to the total number of logic Or inputs, normal inputs and inverted inputs not exceeding 10, it becomes apparent that some of the $A^0$ elements are required when the C register per se is not used but the And circuit outputs are applied back into the associated $A_{05}$ elements. For example, assuming that the $A_{05}$ element in FIGURE 5B has a third normal output which would be applied to a C' element as in FIGURE 6, and the 5-1C, 5-2C, 5-3C, 5-4C And circuit outputs are applied to the Or circuit inputs within element $A_{05}$, the total number of normal outputs, inverted outputs, and Or inputs to element $A_{05}$ is 10. Since there is also required from stage 05 another inverted output, such as is indicated from the $A^0{}_{05}$ element, this latter element is employed. A like situation exists relative to the $A^1{}_{03}$ and $A^1{}_{06}$ elements. The remainder of the $A^0$ elements need not be employed at all even to stay within the limitation of a maximum of 10 for the total number of normal outputs, inverted outputs, and Or inputs.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A binary counter comprising means for at least temporarily storing a plurality of binary signals representing a binary number, means for combining certain of said signals into at least one signal representing a logical Nor function of the so-combined signals, means for combining certain of said binary signals into at least one signal representing a logical And function of the so-combined signals, and means for effectively combining all of said signals into a plurality of binary signals representative of said binary number changed in value by decimal one.

2. A binary counter comprising means for at least temporarily storing a plurality of binary signals representative of a binary number, a plurality of means for respectively combining different groups of said binary signals into at least one logical Nor signal for each such group, a plurality of means for respectively combining different groups of said binary signals into at least one logical And signal for each such group, and a plurality of means for effectively combining all of said signals into a like plurality of binary signals representative of said binary number changed in value by decimal one.

3. A counter as in claim 2 wherein each of the last mentioned means includes And and Or means.

4. A binary counter comprising means for at least temporarily storing a plurality of binary signals representative of a binary number, a plurality of means for respectively combining different groups of said binary signals into at least one respective logical Nor signal for each such group during a first phase time and holding said Nor signals over into a second phase time, a plurality of means for respectively combining different groups of said binary signals into at least one logical And signal for each such group also during said first phase time and holding said And signals over into said second phase time, and a plurality of means operative during said second phase time to effectively combine certain forms of all said signals into a plurality of binary signals representative of said binary number changed in value by decimal one.

5. A binary counter comprising means for at least temporarily storing a plurality of binary signals representative of a binary number, means for inverting each of said binary signals to form logical Not signals, a plurality of means for respectively combining different groups of said Not signals in a logical Or sense to form at least one logical Nor signal for each such group, a plurality of means for respectively combining different groups of said binary signals into at least one logical And signal for each such group, and a plurality of means for effectively combining certain forms of all said binary, Not, Nor, and And signals into a plurality of binary signals representative of said binary number changed in value by decimal one.

6. A binary counter comprising means for at least temporarily storing a plurality of binary signals representative of a binary number, means operative during a first phase time for inverting each of said binary signals to form logical Not signals, a plurality of means for respectively combining different groups of said Not signals in a logical Or sense to form at least one logical Nor signal for each such group during said first phase time and holding said Nor signals over into a second phase time which immediately succeeds said first phase time, a plurality of means for respectively combining different groups of said binary signals into at least one respective logical And signal for each such group also during said first phase time and holding said And signals over into said second phase time, and a plurality of means operative during said second phase time for effectively combining certain forms of all said binary, Not, Nor, and And signals into a plurality of binary signals representative of said binary number changed in value by decimal one.

7. A binary counter comprising means for at least temporarily storing a plurality of binary signals representative of a binary number, means operative during a first phase time to invert each of said binary signals to form logical Not signals, a plurality of means for respectively combining different groups of said Not signals in a logical Or sense to form at least one logical Nor signal for each such group during said first phase time and holding said Nor signals over into a second phase time which immediately succeeds said first phase time, a plurality of of means for respectively combining different groups of said binary signals into at least one logical And signal for each such group also during said first phase time and holding said And signals over into said second phase time, means for inverting certain of said Nor and And signals to form at least one Nor-Not signal and at least one And-Not signal of each so inverted signal respectively, and a plurality of means operative during said second phase time to effectively combine said binary, Not, And, Nor-Not, and And-Not signals into a plurality of binary signals representative of said binary number changed in value by decimal one.

8. A binary counter comprising means for at least temporarily storing a plurality of binary signals representative of a binary number, means for inverting each of said binary signals to form logical Not signals, a plurality of means for respectively combining different groups of said Not signals in a logical Or sense to form at least one logical Nor signal for each such group, a plurality of means for respectively combining different groups of said binary signals into at least one logical And signal for each such group, means for inverting certain of said Nor and And signals to form at least one Nor-Not signal and at least one And-Not signal of each so inverted signal respectively, and a plurality of means for effectively combining said binary, Not, Nor, And, Nor-Not, and And-Not signals into a plurality of binary signals representative of said binary number changed in value by decimal one.

9. A counter as in claim 8 wherein each of the last mentioned means is in a different stage of the counter and provides for its respective $k$th stage a binary signal $C_k$ of the said changed binary number with any $C_k$ having a generalized logical expression of:

$$C_k = \overline{A}_k(A_{k-1}A_{k-2} \ldots A_{k-k})$$
$$+ A_k(\overline{A}_{k-1} + \overline{A}_{k-2} + \ldots \overline{A}_{k-k})$$

wherein any A and $\overline{A}$ with their respective stage subscripts effectively refer respectively to that stage's binary signal of the said stored binary number and the respective one of said Not signals, each of the said last mentioned means including its own predetermined number of And circuits up to a maximum of four with the maximum logical expression for any stage of said counter being in the form of:

$$C_k = \overline{A}_k(XYZ) + A_k(\overline{X}) + A_k(\overline{Y}) + A_k(\overline{Z})$$

wherein each of the X, $\overline{X}$, Y, $\overline{Y}$, Z, and $\overline{Z}$ signals effectively refers to one of the said stored-binary, Not, Nor, And, Not-Nor, and Not-And signals with any X, Y, Z signal and respective $\overline{X}$, $\overline{Y}$, $\overline{Z}$ signal being related to each other in accordance with one of the following:

(1) logical Not of same signal,
(2) logical Not of duplicate signal, and
(3) De Morgan equivalent.

10. A counter as in claim 9 having at least fifteen stages 00 ... 14 with the changed number binary signals for the respective stages being effectively in accordance with the following logical expressions:

$C_{00} = \overline{A}_{00}$
$C_{01} = \overline{A}_{01}(A_{00}) + A_{01}(\overline{A}_{00})$
$C_{02} = \overline{A}_{02}(A_{01}A_{00}) + A_{02}(\overline{A}_{01}) + A_{02}(\overline{A}_{00})$
$C_{03} = \overline{A}_{03}(B_{02}) + A_{03}(B_{01})$
$C_{04} = \overline{A}_{04}(A_{03}B_{02}) + A_{04}(\overline{A}_{03}) + A_{04}(B_{01})$
$C_{05} = \overline{A}_{05}(A_{04}A_{03}B_{02}) + A_{05}(\overline{A}_{04}) + A_{05}(\overline{A}_{03}) + A_{05}(B_{01})$
$C_{06} = \overline{A}_{06}(B_{05}B_{02}) + A_{06}(\overline{B}_{05}) + A_{06}(B_{01})$
$C_{07} = \overline{A}_{07}(A_{06}B_{05}B_{02}) + A_{07}(\overline{A}_{06}) + A_{07}(\overline{B}_{05}) + A_{07}(B_{01})$
$C_{08} = \overline{A}_{08}(\overline{B}_{07}B_{02}) + A_{08}(B_{07}) + A_{08}(B_{01})$
$C_{09} = \overline{A}_{09}(A_{08}\overline{B}_{07}B_{02}) + A_{09}(\overline{A}_{08}) + A_{09}(B_{07}) + A_{09}(\overline{B}_{02})$
$C_{10} = \overline{A}_{10}(A_{09}\overline{B}_{11}\overline{B}_{04}) + A_{10}(\overline{A}_{09}) + A_{10}(B_{11}) + A_{10}(B_{04})$
$C_{11} = \overline{A}_{11}(B_{10}\overline{B}_{11}\overline{B}_{04}) + A_{11}(\overline{B}_{10}) + A_{11}(B_{11}) + A_{11}(B_{04})$
$C_{12} = \overline{A}_{12}(B_{09}\overline{B}_{11}\overline{B}_{04}) + A_{12}(\overline{B}_{09}) + A_{12}(B_{11}) + A_{12}(B_{04})$
$C_{13} = \overline{A}_{13}(B_{13}\overline{B}_{11}\overline{B}_{04}) + A_{13}(\overline{B}_{13}) + A_{13}(B_{11}) + A_{13}(B_{04})$
$C_{14} = \overline{A}_{14}(\overline{B}_{14}\overline{B}_{11}\overline{B}_{04}) + A_{14}(B_{14}) + A_{14}(B_{11}) + A_{14}(B_{04})$ wherein:

$B_{01} = \overline{A}_{02} + \overline{A}_{01} + \overline{A}_{00}$ = one of said Nor signals,
$B_{02} = A_{02}A_{01}A_{00}$ = one of said And signals,
$\overline{B}_{02} = \overline{A_{02}A_{01}A_{00}}$ = one of said And-Not signals,
$B_{04} = \overline{A}_{03} + \overline{A}_{02} + \overline{A}_{01} + \overline{A}_{00}$ = one of said Nor signals,
$\overline{B}_{04} = \overline{\overline{A}_{03} + \overline{A}_{02} + \overline{A}_{01} + \overline{A}_{00}}$ = one of said Nor-Not signals,
$B_{05} = A_{05}A_{04}A_{03}$ = one of said And signals,
$\overline{B}_{05} = \overline{A_{05}A_{04}A_{03}}$ = one of said And-Not signals,
$B_{07} = \overline{A}_{07} + \overline{A}_{06} + \overline{A}_{05} + \overline{A}_{04} + \overline{A}_{03}$ = one of said Nor signals,
$\overline{B}_{07} = \overline{\overline{A}_{07} + \overline{A}_{06} + \overline{A}_{05} + \overline{A}_{04} + \overline{A}_{03}}$ = one of said Nor-Not
$B_{09} = A_{11}A_{10}A_{09}$ = one of said And signals,
$\overline{B}_{09} = \overline{A_{11}A_{10}A_{09}}$ = one of said And-Not signals,
$B_{10} = A_{10}A_{09}$ = one of said And signals,
$\overline{B}_{10} = \overline{A_{10}A_{09}}$ = one of said And-Not signals,
$B_{11} = \overline{A}_{08} + \overline{A}_{07} + \overline{A}_{06} + \overline{A}_{05} + \overline{A}_{04}$ = one of said Nor signals,
$\overline{B}_{11} = \overline{\overline{A}_{08} + \overline{A}_{07} + \overline{A}_{06} + \overline{A}_{05} + \overline{A}_{04}} =$
  one of said Nor-Not signals,
$B_{13} = A_{12}A_{11}A_{10}A_{09}$ = one of said And signals,
$\overline{B}_{13} = \overline{A_{12}A_{11}A_{10}A_{09}}$ = one of said And-Not signals,
$B_{14} = \overline{A}_{13} + \overline{A}_{12} + \overline{A}_{11} + \overline{A}_{10} + \overline{A}_{09} =$
  one of said Nor signals, and
$\overline{B}_{14} = \overline{\overline{A}_{13} + \overline{A}_{12} + \overline{A}_{11} + \overline{A}_{10} + \overline{A}_{09}} =$
  one of said Nor-Not signals.

11. A counter as in claim 10 including means for causing all the said B and $\overline{B}$ signals to be formed during a first phase time and for causing all the said C signals to be formed during an immediately following second phase time.

12. A counter as in claim 9 including means for duplicating each of the said stored binary signals A to form at least one respective duplicate binary signal A' for each counter stage and for inverting the A' signal of each stage to form therefor at least one respective Not signal $\overline{A}'$ which is a duplicate of a respective one of the aforementioned Not signals $\overline{A}$ with the A and $\overline{A}$ signals being those actually stored in said storing means, there being at least fifteen stages 00 ... 14 in said counter with the changed number binary signals for the respective stages being effectively in accordance with the following logical expressions:

$C_{00} = \overline{A}'_{00}$
$C_{01} = \overline{A}'_{01}(A_{00}) + A'_{01}(\overline{A}_{00})$
$C_{02} = \overline{A}'_{02}(A'_{01}A'_{00}) + A'_{02}(\overline{A}'_{01}) + A'_{02}(\overline{A}'_{00})$
$C_{03} = \overline{A}'_{03}(B_{02}) + A'_{03}(B_{01})$
$C_{04} = \overline{A}'_{04}(A_{03}B_{02}) + A'_{04}(\overline{A}_{03}) + A'_{04}(B_{01})$
$C_{05} = \overline{A}'_{05}(A'_{04}A_{03}B_{02}) + A'_{05}(\overline{A}'_{04}) + A'_{05}(\overline{A}_{03})$
$\qquad + A'_{05}(B_{01})$
$C_{06} = \overline{A}'_{06}(B_{05}B_{02}) + A'_{06}(\overline{B}_{05}) + A'_{06}(B_{01})$
$C_{07} = \overline{A}'_{07}(A'_{06}B_{05}B_{02}) + A'_{07}(\overline{A}'_{06}) + A'_{07}(\overline{B}_{05})$
$\qquad + A'_{07}(B_{01})$
$C_{08} = \overline{A}'_{08}(\overline{B}_{07}B_{02}) + A'_{08}(B_{07}) + A'_{08}(B_{01})$
$C_{09} = \overline{A}'_{09}(A'_{08}\overline{B}_{07}B_{02}) + A'_{09}(\overline{A}'_{08}) + A'_{09}(B_{07})$
$\qquad + A'_{09}(\overline{B}_{02})$
$C_{10} = \overline{A}'_{10}(A_{09}\overline{B}_{11}\overline{B}_{04}) + A'_{10}(\overline{A}_{09}) + A'_{10}(B_{11}) + A'_{10}(B_{04})$
$C_{11} = \overline{A}'_{11}(B_{10}\overline{B}_{11}\overline{B}_{04}) + A'_{11}(\overline{B}_{10}) + A'_{11}(B_{11}) + A'_{11}(B_{04})$
$C_{12} = \overline{A}'_{12}(B_{09}\overline{B}_{11}\overline{B}_{04}) + A'_{12}(\overline{B}_{09}) + A'_{12}(B_{11}) + A'_{12}(B_{04})$
$C_{13} = \overline{A}'_{13}(B_{13}\overline{B}_{11}\overline{B}_{04}) + A'_{13}(\overline{B}_{13}) + A'_{13}(B_{11}) + A'_{13}(B_{04})$
$C_{14} = \overline{A}'_{14}(\overline{B}_{14}\overline{B}_{11}\overline{B}_{04}) + A'_{14}(B_{14}) + A'_{14}(B_{11}) + A'_{14}(B_{04})$ wherein:

$B_{01} = \overline{A}_{02} + \overline{A}_{01} + \overline{A}_{00}$ = one of said Nor signals,
$B_{02} = A_{02}A_{01}A_{00}$ = one of said And signals,
$\overline{B}_{02} = \overline{A_{02}A_{01}A_{00}}$ = one of said And-Not signals,
$B_{04} = \overline{A}_{03} + \overline{A}_{02} + \overline{A}_{01} + \overline{A}_{00}$ = one of said Nor signals,
$\overline{B}_{04} = \overline{\overline{A}_{03} + \overline{A}_{02} + \overline{A}_{01} + \overline{A}_{00}}$ = one of said Nor-Not signals,
$B_{05} = A_{05}A_{04}A_{03}$ = one of said And signals,
$\overline{B}_{05} = \overline{A_{05}A_{04}A_{03}}$ = one of said And-Not signals,
$B_{07} = \overline{A}_{07} + \overline{A}_{06} + \overline{A}_{05} + \overline{A}_{04} + \overline{A}_{03}$ = one of said Nor signals,
$\overline{B}_{07} = \overline{\overline{A}_{07} + \overline{A}_{06} + \overline{A}_{05} + \overline{A}_{04} + \overline{A}_{03}}$ = one of said Nor-Not signals,
$B_{09} = A_{11}A_{10}A_{09}$ = one of said And signals,
$\overline{B}_{09} = \overline{A_{11}A_{10}A_{09}}$ = one of said And-Not signals,
$B_{10} = A_{10}A_{09}$ = one of said And signals,
$\overline{B}_{10} = \overline{A_{10}A_{09}}$ = one of said And-Not signals,
$B_{11} = \overline{A}_{08} + \overline{A}_{07} + \overline{A}_{06} + \overline{A}_{05} + \overline{A}_{04}$ = one of said Nor signals,
$\overline{B}_{11} = \overline{\overline{A}_{03} + \overline{A}_{07} + \overline{A}_{06} + \overline{A}_{05} + \overline{A}_{04}}$ = on of said Nor-Not signals,
$B_{13} = A_{12}A_{11}A_{10}A_{09}$ = one of said And signals,
$\overline{B}_{13} = \overline{A_{12}A_{11}A_{10}A_{09}}$ = one of said And-Not signals,
$B_{14} = \overline{A}_{13} + \overline{A}_{12} + \overline{A}_{11} + \overline{A}_{10} + \overline{A}_{09}$ = one of said Nor signals, and
$\overline{B}_{14} = \overline{\overline{A}_{13} + \overline{A}_{12} + \overline{A}_{11} + \overline{A}_{10} + \overline{A}_{09}}$ = one of said Nor-Not signals.

13. A counter as in claim 12 including means for causing all the said $A'$, $\overline{A}'$, $B$, $\overline{B}$ signals to be formed during a first phase time and for causing all the said $C$ signals to be formed during an immediately following second phase time.

14. A counter as in claim 12 including means for effectively duplicating the $A_{00}$, $\overline{A}_{00}$, $A_{03}$, $\overline{A}_{03}$, $A_{09}$, and $\overline{A}_{09}$ signals to form $B_{00}$, $\overline{B}_{00}$, $B_{03}$, $\overline{B}_{03}$, $B_{08}$, and $\overline{B}_{08}$ signals, respectively, to cause the said $C_{01}$, $C_{04}$ and $C_{10}$ expressions to be:

$C_{01} = \overline{A}'_{01}(B_{00}) + A'_{01}(\overline{B}_{00})$
$C_{04} = \overline{A}'_{04}(B_{03}B_{02}) + A'_{04}(\overline{B}_{03}) + A'_{04}(B_{01})$
$C_{10} = \overline{A}'_{10}(B_{03}\overline{B}_{11}\overline{B}_{04}) + A'_{10}(\overline{B}_{08}) + A'_{10}(B_{11}) + A'_{10}(B_{04})$ 15. A counter as in claim 12 including means in said storing means for at least temporarily storing binary signals $A°_{09}$ and $A°_{10}$, which are respective duplicates of the aforementioned stored binary signals $A_{09}$ and $A_{10}$, to cause at least the said logical expressions for $B_{09}$, $\overline{B}_{09}$, $B_{10}$, $\overline{B}_{10}$, respectively, to become at least:

$$B_{09} = A_{11}A°_{10}A_{09}$$
$$\overline{B}_{09} = \overline{A_{11}A°_{10}A°_{09}}$$
$$B_{10} = A_{10}A°_{09}$$
$$\overline{B}_{10} = \overline{A_{10}A°_{09}}$$

16. A counter as in claim 12 including means in said storing means for at least temporarily storing a duplicate binary signal of at least the aforementioned stored binary signal $A_{05}$ so as to give rise to the duplicate binary signal $A°_{05}$, means for inverting the $A°_{05}$ signal to form a logical Not signal $\overline{A}°_{05}$, means for duplicating the said $B_{11}$ and $\overline{B}_{11}$ signals to form $B_{12}$ and $\overline{B}_{12}$ signals in accordance with at least the following expressions respectively:

$$B_{12} = \overline{A}_{08} + \overline{A}_{07} + \overline{A}_{06} + \overline{A}°_{05} + \overline{A}_{04}$$
$$\overline{B}_{12} = \overline{\overline{A}_{08} + \overline{A}_{07} + \overline{A}_{06} + \overline{A}°_{05} + \overline{A}_{04}}$$

and including means for causing at least one of the $C_{10}$, $C_{11}$, $C_{12}$, $C_{13}$, $C_{14}$ signals to be formed by using said $B_{12}$ and $\overline{B}_{12}$ signals instead of said $B_{11}$ and $\overline{B}_{11}$ signals respectively.

17. A counter as in claim 12 including means in said storing means for at least temporarily storing binary signals $A°_{05}$, $A°_{09}$ and $A°_{10}$, which are respective duplicates of the aforementioned stored binary signals $A_{05}$, $A_{09}$, $A_{10}$, to cause the said logical expressions for $B_{09}$, $\overline{B}_{09}$, $B_{10}$ and $\overline{B}_{10}$, respectively to become at least:

$$B_{09} = A_{11}A°_{10}A_{09}$$
$$\overline{B}_{09} = \overline{A_{11}A°_{10}A°_{09}}$$
$$B_{10} = A_{10}A°_{09}$$
$$\overline{B}_{10} = \overline{A_{10}A°_{09}}$$

means for inverting the $A°_{05}$ signal to form a logical Not signal $\overline{A}°_{05}$, means for duplicating the said $B_{11}$ and $\overline{B}_{11}$ signals to form $B_{12}$ and $\overline{B}_{12}$ signals in accordance with at least the following expressions respectively:

$$B_{12} = \overline{A}_{08} + \overline{A}_{07} + \overline{A}_{06} + \overline{A}°_{05} + \overline{A}_{04}$$
$$\overline{B}_{12} = \overline{\overline{A}_{08} + \overline{A}_{07} + \overline{A}_{06} + \overline{A}°_{05} + \overline{A}_{04}}$$

and including means for causing at least one of the $C_{10}$, $C_{11}$, $C_{12}$, $C_{13}$, $C_{14}$ signals to be formed by using said $B_{12}$ and $\overline{B}_{12}$ signals instead of said $B_{11}$ and $\overline{B}_{11}$ signals respectively.

18. A counter as in claim 17 including further means in said storing means for at least temporarily storing binary signals $A°_{00}$, $A°_{01}$, $A°_{02}$, $A°_{03}$, $A°_{04}$, $A°_{06}$, $A°_{07}$, $A°_{08}$, $A°_{11}$, which are respective duplicates of the aforementioned stored binary signals $A_{00}$, ... $A_{04}$, $A_{06}$, ... $A_{08}$, and $A_{11}$, means for inverting the $A°_{00}$ ... $A°_{04}$, $A°_{06}$, ... $A°_{08}$ signals to form logical Not signals $\overline{A}°_{00}$, $\overline{A}°_{01}$, $\overline{A}°_{02}$, $\overline{A}°_{03}$, $\overline{A}°_{04}$, $\overline{A}°_{06}$, $\overline{A}°_{07}$, $A°_{08}$, means for duplicating the said $B_{04}$, $\overline{B}_{04}$, $B_{11}$ and $\overline{B}_{11}$ signals to form respective $B_{06}$ $\overline{B}_{06}$, $B_{12}$ and $\overline{B}_{12}$ signals in accordance with the following expressions:

$$B_{06} = \overline{A}°_{03} + \overline{A}°_{02} + \overline{A}°_{01} + \overline{A}°_{00}$$
$$\overline{B}_{06} = \overline{\overline{A}°_{03} + \overline{A}°_{02} + \overline{A}°_{01} + \overline{A}°_{00}}$$
$$B_{12} = \overline{A}°_{08} + \overline{A}°_{07} + \overline{A}°_{06} + \overline{A}°_{05} + \overline{A}°_{04}$$
$$\overline{B}_{12} = \overline{\overline{A}°_{03} + \overline{A}°_{07} + \overline{A}°_{06} + \overline{A}°_{05} + \overline{A}°_{04}}$$

means for causing the said $B_{09}$ and $\overline{B}_{09}$ signal expressions to become respectively:

$$B_{09} = A°_{11}A°_{10}A°_{09}$$
$$\overline{B}_{09} = \overline{A°_{11}A°_{10}A°_{09}}$$

and means for causing the $C_{12}$, $C_{13}$ and $C_{14}$ signal expressions to become respectively:

$C_{12} = \overline{A}'_{12}(B_{09}\overline{B}_{11}\overline{B}_{04}) + A'_{12}(\overline{B}_{09}) + A'_{12}(B_{12}) + A'_{12}(B_{06})$
$C_{13} = \overline{A}'_{13}(B_{13}\overline{B}_{12}\overline{B}_{06}) + A'_{13}(\overline{B}_{13}) + A'_{13}(B_{12}) + A'_{13}(B_{06})$
$C_{14} = \overline{A}'_{14}(B_{14}\overline{B}_{12}\overline{B}_{06}) + A'_{14}(B_{14}) + A'_{14}(B_{12}) + A'_{14}(B_{06})$ 19. A counter as in claim 18 including means for causing all of the said $A'$, $\overline{A}'$, $B$, $\overline{B}$ signals to be formed during a first phase time and for causing all the said $C$ signals to be formed during an immediately following second phase time.

20. A binary counter comprising means for providing signals representing normal and complemented binary digits of a binary number, a plurality of means each for combining the signals for different groups of said complemented digit signals in a logical Or sense, a plurality of means each for combining the signals in different groups of said normal digit signals in a logical And sense, and a plurality of means, each including a different And and Or means, coupled to effectively receive said normal and complemented digit signals and signals from each of said combining means for producing signals representative of said binary number changed in value by decimal one.

21. A binary counter comprising means including a first register having a plurality of stages for at least initially containing signals representing a binary number, a slave register, a sensing register, means for transferring said signals to said slave register during a first phase time and simultaneously filling the sensing register with signals representing a predetermined combination of normal and inverted digits of said number, said last mentioned means including a plurality of And circuits each of which receives a number of said digit signals which is less by at least two than the number of stages in said first register, and a plurality of second And circuits coupled to the outputs of said slave and sensing registers for producing during a second phase time signals representative of said number changed in value by decimal one.

22. A binary counter comprising means including a first register having a plurality of stages for providing signals logically representing normal and complemented binary digits of a binary number at least temporarily stored in at least said first register, a sensing register, means, including a plurality of And circuits each of which is incapable of handling more logical input signals than the number of said first register stages less at least two, for transferring said normal and complemented logical digit signals during a first phase time to said sensing register in certain combinations at least partially effected at said And circuits, and a different And and Or means for each of said stages coupled to the outputs of said sensing register for producing during a second phase time signals representative of said binary number changed in value by decimal one.

23. A binary counter comprising a register having a plurality of stages for containing signals representing in binary form the equivalent of a given decimal number; and means for changing that number by decimal one in two phase times comprising: a plurality of And circuits divided into groups respectively associated with said stages with all said groups except that associated with the first register stage having more than one of said And circuits, means for providing during a first phase time normal and inverted signal versions of signals in said register, a plurality of Or circuits respectively associated with said groups of And circuits with an output of each And circuit being coupled to an input of its associated Or circuit, and means for applying said normal and inverted signal versions as logical inputs simultaneously to and conditionally through said And circuits to said Or circuits during a second phase time to cause from the Or circuits a binary signal representation of a second decimal number which is different by decimal one than said given decimal number.

24. A counter as in claim 23 wherein the last mentioned means includes a sensing register having a plurality of stages some of which receive a plurality of said inverted signal versions and combine them in a logical Or sense and others of which include means for receiving said normal signal versions and combining them in an And sense with each stage of said sensing register applying to at least one of said And circuits as part of said logical inputs a normal signal versions of its logical contents while some of said sensing register stages apply to at least one other And circuit as another of said logical inputs an inverted signal version of their respective logical contents.

25. A binary counter comprising a register having a plurality of stages for containing signals representing in binary form the equivalent of a given decimal number; and means for changing that number by decimal one in two phase times comprising: a plurality of And circuits divided into groups respectively associated with said stages with all said groups except that associated with the first register stage having more than one of said And circuits, each of said And circuits having at most a maximum capacity of logical inputs less in number by at least two than the number of stages in said register, means including means in said register for providing during a first phase time normal and inverted signal verisons of signals in said register, a plurality of Or circuits respectively associated with said groups of And circuits with an output of each And circuit being coupled to an input of its associated Or circuit, and means for applying said normal and inverted signal versions as logical inputs simultaneously to and conditionally through said And circuits, within the limits of said maximum capacity, to said Or circuits during a second phase time to cause from the Or circuits a binary signal representation of a second decimal number which is different by decimal one than said given decimal number.

26. A binary counter comprising a first register for at least initially containing signals representing a binary number in N binary stages each capable of providing at least one normal output of its contents with each of at least some of said stages being capable of additionally providing at least one inverted output of its contents, a slave register having N binary stages respectively associated with the stages of said first register, each stage of the slave register being capable of providing normal and inverted outputs of its contents, a sensing register having N binary stages associated with the respective stages of said first and slave registers, at least some of the sensing register stages being capable of producing normal and inverted outputs of their respective contents, means for applying, during a first phase time, normal outputs of the first register to respective stages of said slave register, a normal output of the first stage of said first register to the first stage of said sensing register, and inverted and normal outputs from said first register in certain combinations to the remaining sensing register stages, a predetermined number of And circuits for each counter stage, and means coupling certain inverted and normal outputs from the slave and sensing registers as respective logical inputs to and conditionally through said And circuits during a second phase time, with each such And circuit receiving no more than $(N-P)$ of those logical inputs where P is an integer greater than one but less than N, for causing the Anding results at each stage as a whole to represent a respective digit of a binary number whose decimal equivalent is different by one than the decimal equivalent of the aforementioned binary number.

27. A counter as in claim 26 wherein said applying means includes a plurality of second And circuits for respectively and conditionally applying different groups of first register normal outputs to part of the said remaining sensing register stages and a plurality of Or circuits respectively coupled to the rest of the said remaining sensing register stages for applying thereto respectively different groups of said first register inverted outputs, each of said groups of first register normal outputs containing no more then $(N-P)$ of such outputs.

28. A binary counter comprising a first register for at least initially containing signals representing a binary number in N binary stages each capable of providing at least one normal output of its contents with each of at least some of said stages being capable of additionally providing at least one inverted output of its contents, a slave register having N binary stages respectively associated with the stages of said first register, each stage of the slave register being capable of providing normal and inverted outputs of its contents, a sensing register having N binary stages associated with the respective stages of said first and slave registers, each of the sensing register stages being capable of producing at least one normal output with each of at least some of the sensing register stages being capable of additionally producing at least one inverted output of its contents, means for applying, during a first phase time, normal outputs of the first register to respective stages of said slave register, a normal output of the first stage of said first register to the first stage of said sensing register, and inverted and normal outputs from said first register in certain combinations to the remaining sensing register stages, a plurality of And circuits divided into groups respectively associated with the counter stages with all said groups, except that group associated with the first counter stage, having more than one of said And circuits, a plurality of Or circuits respectively associated with said groups of And circuits with an output of each And circuit being coupled to an input of its associated Or circuit, and means coupling certain inverted and normal outputs from the slave and sensing registers as respective logical inputs to and conditional through said And circuits, with each of said And circuits receiving no more than $(N-P)$ of those logical inputs where P is an integer greater than one but less than N, and to said Or circuits during a second phase time for causing from the Or circuits a binary signal representation of a decimal number which is different by one than the decimal equivalent of the aforementioned binary number.

29. A counter as in claim 28 wherein said applying means includes a plurality of second And circuits for respectively and conditionally applying different groups of first register normal outputs to some of the said remaining sensing register stages and a plurality of second Or circuits respectively coupled to the rest of the said remaining sensing register stages for applying thereto respectively different groups of said first register inverted outputs, each of said groups of first register outputs containing no more than $(N-P)$ of such outputs.

30. A binary counter comprising means for providing signals representing normal and complemented binary digits of a binary number, a plurality of means for respectively combining different groups of said binary signals into at least one respective logical Nor signal for each such group during a first phase time and holding said Nor signals over into a second phase time, a plurality of means for respectively combining different groups of said binary signals into at least one logical And signal for each group also during said first phase time and holding said And signals over into said second phase time, and a plurality of means operative during said second phase time to effectively combine certain forms of all said signals into a plurality of binary signals representative of said binary number changed in value by decimal one.

References Cited by the Examiner

UNITED STATES PATENTS

| | | | |
|---|---|---|---|
| 2,837,278 | 6/58 | Schreiner et al. | 235—176 |
| 2,907,526 | 10/59 | Havens | 235—174 |
| 2,910,240 | 10/59 | Havens | 235—174 |
| 2,962,212 | 11/60 | Schneider | 235—92 |
| 3,108,226 | 10/63 | Douglas | 328—42 |

MALCOLM A. MORRISON, *Primary Examiner.*

WALTER W. BURNS, JR., *Examiner.*